(12) United States Patent
Shih

(10) Patent No.: US 9,747,358 B2
(45) Date of Patent: Aug. 29, 2017

(54) PATTERN ANALYSIS FOR A MULTI-DIMENSIONAL ANALYTICAL SYSTEM

(75) Inventor: Jenngang Shih, Concord, CA (US)

(73) Assignee: SAP SE, Walldorf (DE)

(*) Notice: Subject to any disclaimer, the term of this patent is extended or adjusted under 35 U.S.C. 154(b) by 1326 days.

(21) Appl. No.: 12/564,814

(22) Filed: Sep. 22, 2009

(65) Prior Publication Data

US 2011/0072392 A1    Mar. 24, 2011

(51) Int. Cl.
*G06F 3/00* (2006.01)
*G06F 9/00* (2006.01)
*G06F 17/00* (2006.01)
*G06F 17/30* (2006.01)

(52) U.S. Cl.
CPC .............................. *G06F 17/30592* (2013.01)

(58) Field of Classification Search
CPC ........ G06F 9/4443; G06F 8/34; G06F 3/0481; G06F 3/0482; G06F 8/38; G06F 3/04847; G06F 17/30398; G06F 3/0237; G06F 17/30592; H04N 1/00389; H04N 1/00411
USPC ....... 715/738, 739, 744, 745, 747, 760, 762, 715/763, 764, 765, 811, 812, 813, 854, 715/855, 864, 865, 968
See application file for complete search history.

(56) References Cited

U.S. PATENT DOCUMENTS

| | | | |
|---|---|---|---|
| 6,081,798 A * | 6/2000 | Johnson et al. | 706/54 |
| 7,159,011 B1 * | 1/2007 | Knight et al. | 709/207 |
| 7,801,874 B2 * | 9/2010 | Bernacki et al. | 707/706 |
| 2003/0195874 A1 * | 10/2003 | Akaboshi | 707/3 |
| 2007/0130140 A1 * | 6/2007 | Cytron et al. | 707/6 |
| 2007/0198485 A1 * | 8/2007 | Ramer et al. | 707/3 |
| 2008/0184140 A1 * | 7/2008 | Koerner | 715/762 |
| 2008/0214155 A1 * | 9/2008 | Ramer et al. | 455/414.1 |
| 2009/0204566 A1 * | 8/2009 | Barsness et al. | 707/1 |

* cited by examiner

*Primary Examiner* — Kieu Vu
*Assistant Examiner* — Anita D Chaudhuri

(57) ABSTRACT

A pattern analysis system enables a user to obtain specific analysis from multi-dimensional storage structures. The patterns analysis system guides the user interaction through the selection of specific available patterns. This enables the user to gain access to analytics data available in the multi-dimensional storage structure without specific knowledge of a command system syntax or semantics. Also, the user does not need knowledge of the contents or organization of the multi-dimensional storage structure.

21 Claims, 7 Drawing Sheets

PATTERN ANALYSIS FOR A MULTI-DIMENSIONAL ANALYTICAL SYSTEM

BACKGROUND

Field of the Invention

This invention is related to a data query system. Specifically, the invention is related to a method and apparatus for a guided query system for multi-dimensional storage structures.

Background

Current analytics applications attempt to provide easy access to analytic information. These applications get their data from transactional systems through a process involving extraction, transformation and loading. In this process, transaction data is collected, cleaned, codified and reorganized and loaded by the analytic application to generate reports and analysis. However, current analytic applications have many significant drawbacks.

To obtain specific analytic information or data when the user is not aware of a pre-defined report or search for this data, a user of an analytic program must navigate a series of user interfaces to find the data necessary to answer their questions. This navigation of the available data is tedious and time consuming for the user. The navigation process diminishes the productivity of the user due to the extensive trial and error required to find the necessary data. These navigations lack any structure or guidance to assist the user in finding the necessary data for generating concrete analysis.

Other database searching procedures and functions are unsuited or inefficient for the purposes of identifying specific analytic information where pre-defined searches or reports are not known to the user. Traditional search engines that allow the entry of English questions generate non-deterministic results and lack focus due to the difficulty of parsing the user's intent from the input of the English language text. To obtain deterministic results strictly defined codes or commands must be utilized. Even if English language phrases are correlated to these codes or commands in place of esoteric programming language commands or codes, the user is required to understand the details of the data structure being queried and to understand the semantics and syntax necessary for the use of the commands and codes to construct precise queries using these commands, codes and knowledge of the data structure. Hybrids of these systems have not significantly mitigated these drawbacks.

BRIEF DESCRIPTION OF THE DRAWINGS

Embodiments of the invention are illustrated by way of example and not by way of limitation and the figures of the accompanying drawings in which like references indicate similar elements. It should be noted that different references to "an" or "one" embodiment in this disclosure are not necessarily to the same embodiment, and such references mean at least "one."

DETAILED DESCRIPTION

Figure 1:
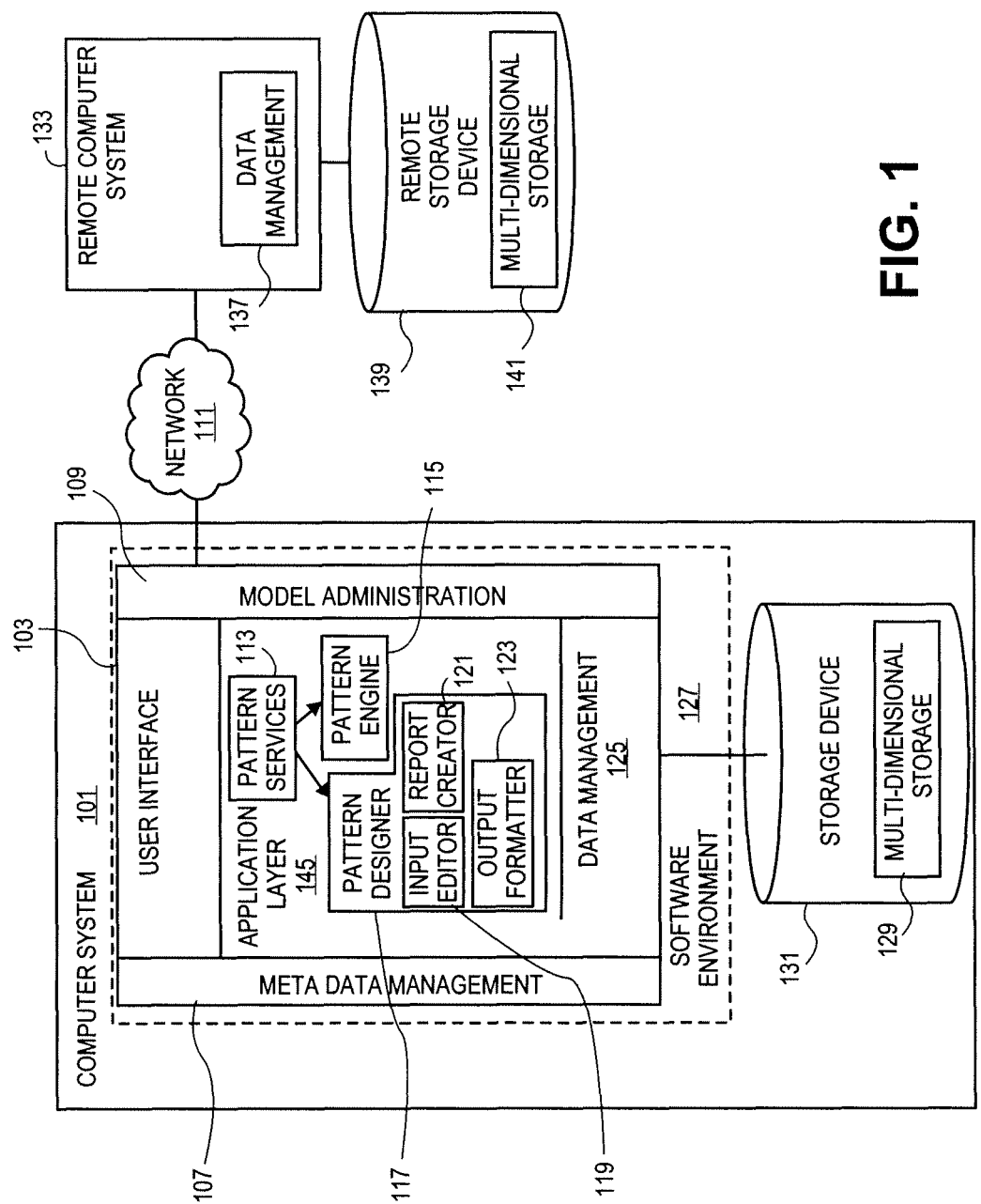
FIG. 1 is a diagram of one embodiment of a pattern analysis system.

FIG. 1 is a diagram of one embodiment of a pattern analysis system. In one embodiment, the pattern analysis system includes at least one computer system 101 that implements a pattern service module 113, pattern engine 115 and a pattern designer 117. In some embodiments, the pattern analysis system may be a distributed system. The distributed system can include any number of remote computing devices 133 that communicate with the computer system 101 over a network 111. The computer system 101 and remote computer system 133 can be any type of computing devices including desktop computers, dedicated servers, workstations, laptop computers, network elements, handheld devices and similar computing devices. Network 111 may be a local area network (LAN), a wide area network (WAN), such as the Internet, or similar telecommunication system. The network 111 may be composed of any number of network elements and communicate over any number of mediums including wireless communications and wired communication lines.

The computer system 101 can implement the pattern analysis system as software, hardware components or any combination thereof. In one embodiment, the pattern analysis system is implemented primarily in an application layer 145 of a local software environment 127 that includes an interface layer 103, data management layer 125, model administration layer 109 and a metadata management layer 107. The application layer 145 may include any number of applications other than the pattern analysis system, which operate within the software environment 127. The user interface layer 103 provides standard user interface elements including windows, buttons, fixed fields and similar user interface elements that enable a user to view and interact with the pattern analysis system and the data output by the components of the pattern analysis system. The data management layer 125 manages the retrieval of data, storage of data and querying that involve a multi-dimensional storage structure and/or a storage device or database in which a multi-dimensional storage structure 129 is stored. Data management layer 125 can manage any number of multi-dimensional storage structures 129, which may be stored locally or remotely in any number of storage devices 131, 139. As used herein a "multi-dimensional storage structure" refers to a data source with data organized by at least two types of relational tables, dimensional tables and measure tables (sometimes referred to as fact tables), where dimensional tables contain categorical data and measure tables contain numerical data and the two types of tables are correlated via foreign keys.

The software environment 127 may also include a metadata management layer 107. The metadata management layer 107 provides a reference for all available data structures, resources and functions within the software environment 127. Any of the other layers can draw on and interface with the metadata management layer to obtain this information. The model administration layer 109 facilitates the storage and retrieval of models such as patterns for use by the components of the pattern analysis system.

The pattern analysis system includes a pattern service module 113, a pattern engine 115 and a pattern designer 117. The pattern service module 113 interacts with the user interface layer 103 and receives user input to facilitate the interaction of the user with the pattern designer 117 and the pattern engine 115. The pattern service module 113 interfaces with the user interface layer 103 and the other aspects of the software environment 127 to generate and display the guided user interface that enables the user to select a pattern and input pattern parameters. The pattern service module 113 then passes the pattern selection and pattern parameters to the pattern engine 115. The pattern engine 115 executes the selected pattern and pattern parameters and generates a report. The patterns engine 115 then returns the report, data and related output directly through the user interface layer 103 to the user or back through the pattern service module 115, which in turn displays the generated report through the user interface 103.

The pattern designer 117 includes an input editor 119, report creator 121 and output formatter 123. The pattern designer 117 is an application that enables the user to generate new patterns, which then can be stored and utilized by the user or other users. These new patterns are managed by the model administration layer 109. The input editor 119 is a component that enables the user to define a set of parameters that are associated with a pattern. This defined set of parameters limits or specifies the types of data that the associated pattern can process or that are needed for processing by the pattern. A "set," as used herein, refers to any positive whole number of items, including one item. The input editor 119 defines a set of parameters and is also used when generating the guided pattern selection to identify the allowable set of parameters to be used with the pattern. The input editor 119 also allows the user to define a name for the definition, an associated 'user intent' and an associated report in which the input is used. The user intent is an identifier that can be used by the guided pattern selection process to identify the data (e.g., analysis results in the form of reports) that the user is seeking.

The report creator 121 is a component that enables the user to define the report generation sequence, to identify the name of the report, to identify a type for the result, and to identify an output format for the result. The report sequence is executed by the pattern engine 115 to obtain the results sought by a user. The report sequence identifies a set of steps for processing the pattern parameters and retrieving necessary information from the multi-dimensional storage structure of the parameters of the pattern specified through the input editor. These steps include accessing the appropriate measure data and numeric data or measure data and dimensional data identified by the input parameters, as well as, defining a formula or algorithm to apply to the retrieved data (e.g., analysis results, such as volume, trend, comparison, benchmark, or count formulas).

The output formatter 123 is a component that enables the user to define a name for the output, identify the analysis result associated with the output format and to identify a template for the display of the output. In one embodiment, the output formatter 123 may also allow the definition of the template or the modification of the template. The output formats defined by the output formatter 123 are used by the pattern engine 115 and/or the pattern service module 113 to organize and format the pattern result data to be displayed to a user. In one embodiment, the pattern engine 115 is responsible for output formatting, and pattern service module 113 is responsible for passing the formatted output to the presentation layer.

In one embodiment, the pattern analysis system is a distributed system where the pattern service module 113, pattern engine 115 and pattern designer 117 may be accessible over a network 111 at a remote computer system 133. Similarly, the output of the pattern analysis system may be viewable over a network 111 through a remote computer system 133. The remote computer system 133 can implement any part of the pattern analysis system or the software environment or any subcomponent thereof locally. In one embodiment, the remote computer system 133 implements a remote data storage management layer 137. In one embodiment, the system provides a Rich Internet Application (RIA). Once the application is loaded on the remote computer system 133, there is only data sent across the network 111.

In this embodiment, the pattern analysis system that is implemented on computer system 101 may access remote storage devices 139 and multi-dimensional storage structures 141 over the network 111 at the remote computer system 133. Any number of computers and storage systems may operate over a set of networks to provide the functionality of the pattern analysis system in a distributor fashion. One of ordinary skill in the art would understand that the embodiment described herein is by way of example and that other variations utilizing the principles and components described herein are within the scope of the invention.

Figure 2:
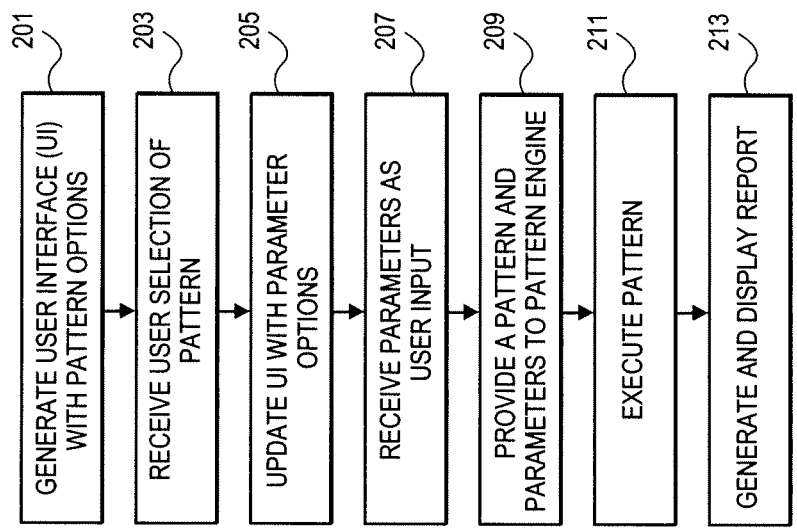
FIG. 2 is a flowchart of one embodiment of a pattern analysis process.

FIG. 2 is a flowchart of one embodiment of the process of the pattern analysis system. In one embodiment the pattern analysis system is initiated by a user through a user interface or similarly activated. The pattern analysis system may be a component of or integrated with any type of program including performance management systems and similar enterprise software. The pattern analysis system through the pattern service module and user interface layer generates a pattern selection screen and user interface (Block 201). The pattern selection screen can present the available patterns through a text based, menu based or similar type of user interface. The available patterns are identified by an associated 'user intent,' allowing the user to identify a pattern without having to have specific knowledge of the pattern such as the processes and parameters of the pattern. The user interacts with the pattern selection screen of the user interface to select one of the available patterns (Block 203). The pattern services module presents only those patterns that are available as options to the user.

Upon selection of a pattern, the user interface is updated by the pattern services module to display the set of parameters that are available and associated with the selected pattern (Block 205). The available parameters can be displayed through a parameter selection screen. Only the available parameters are displayed, allowing the user to select parameters appropriate for obtaining the desired data and that are supported by the selected pattern without requiring specific knowledge about the pattern or parameter associations from the user. The user then selects which of these parameters the user wishes to use in conjunction with the selected pattern (Block 207). The pattern services module then calls the pattern engine and provides a copy of the selected pattern and the selected parameters to the pattern engine (Block 209).

The pattern engine then executes the pattern and generates a result using the selected pattern, the input parameters and data from the multi-dimensional storage structure (Block 211). The result data is then formatted into a report to be displayed to the user (Block 213). The patterns are a defined sequence of functions and parameters coupled with the output template that interact with the multi-dimensional data store to provide a user with desired analysis in a deterministic fashion without requiring the user to have knowledge of the available commands, queries, reports and/or contents and structure of the multi-dimensional storage structure.

Figure 3A:
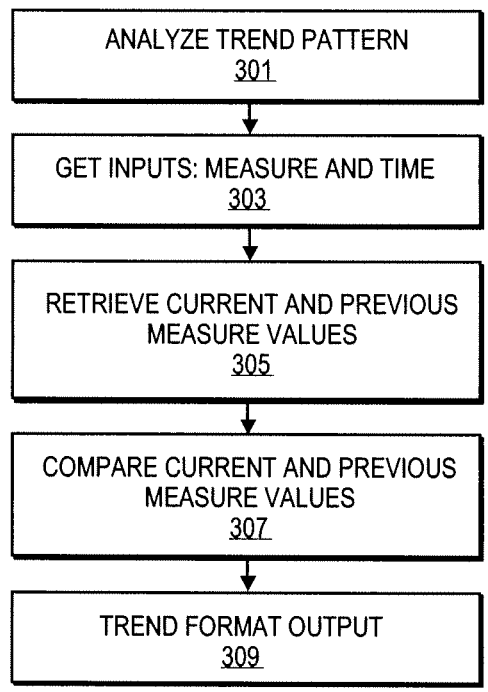
FIG. 3A is a flowchart of one embodiment of a pattern for trend analysis.

FIG. 3A is a flowchart of one embodiment of a pattern for trend analysis. In the example pattern, a trend pattern is initiated by the selection of the specific trend pattern by a user (Block 301). A trend pattern can be selected by a user based on the user's intent identifier. For example, a trend pattern may be selected to calculate a trend in bond prices. The process then receives the inputs specified by the user, in this case, measure data and time data for a specific multi-dimensional storage structure (Block 303). In the bond price trend example, the measure would be selected from the available parameters as 'bond prices' and the time data selected as 'Monday.' In some embodiments, the identified input data is retrieved as an object, block or set of data. The specific data required for the pattern is then retrieved from this data (Block 305). In the trend pattern, the current and previous measure values are identified. The current and previous measure values are then compared to determine whether they indicate a positive or negative trend (Block 307). This information is then inserted or organized into a trend format that is associated with the trend pattern and output to a display to be viewed by a user (Block 309). In the trend pattern format example, the output could be "Bond prices rose on Monday." The result data can also be stored or otherwise output for the user.

Figure 3B:
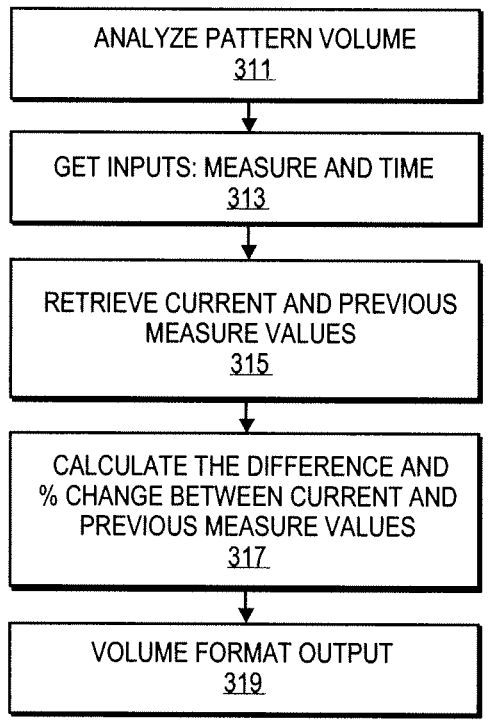
FIG. 3B is a flowchart of one embodiment of a pattern for volume analysis.

FIG. 3B is a flowchart of one embodiment of a pattern for volume analysis. In the example pattern, a volume pattern is initiated by the selection of the specific volume pattern by a user (Block 311). A volume pattern can be selected by a user based on the user's intent identifier. For example, a volume pattern may be selected to calculate a Dow Jones industrial average volume. The process then receives the inputs specified by the user, in this case, measure data and time data for a specific multi-dimensional storage structure (Block 313). In the Dow Jones volume example, the measure would be selected from the available parameters as 'Dow Jones industrial average' and the time data selected as 'today.' In some embodiments, the identified input data is retrieved as an object, block or set of data. The specific data required for the pattern is then retrieved from this data (Block 315). In the volume pattern, the current and previous measure values are identified. The current and previous measure values are then used to determine the difference and percent of change between the current and previous measure values (Block 317). This information is then inserted or organized into a volume format that is associated with the volume pattern and output to a display to be viewed by a user (Block 319). In the volume pattern format example, the output could be "the Dow Jones Industrial average fell 15.87, or 0.2 percent to 8,539.73.' The result data can also be stored or otherwise output for the user.

Figure 3C:
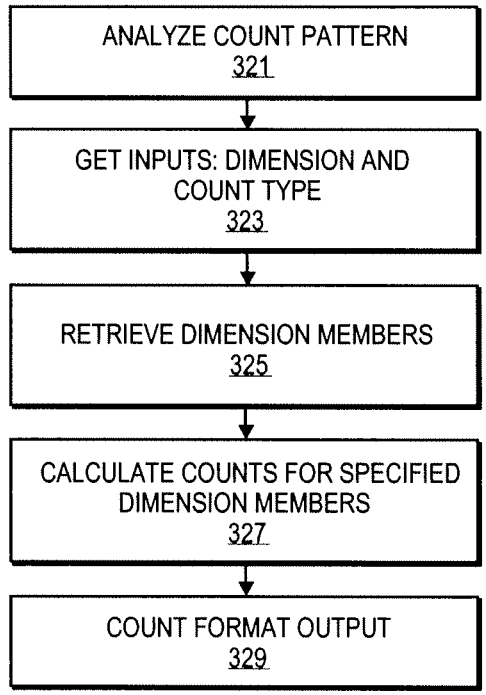
FIG. 3C is a flowchart of one embodiment of a pattern for count analysis.

FIG. 3C is a flowchart of one embodiment of a pattern for count analysis. In the example pattern, a count pattern is initiated by the selection of the specific count pattern by a user (Block 321). A count pattern can be selected by a user based on the user's intent identifier. For example, a count pattern may be selected to calculate a number of stocks that rose on the New York Stock Exchange for a given time period. The process then receives the inputs specified by the user, in this case, dimension data and count type data for a specific multi-dimensional storage structure (Block 323). In the New York Stock Exchange count example, the dimension would be selected from the available parameters as 'New York Stock Exchange' and the count type data selected as 'stock performance.' In some embodiments, the identified input data is retrieved as an object, block or set of data. The specific data required for the pattern is then retrieved from this data (Block 325). In the count pattern, the dimension members are identified. The dimension members are then used to determine the counts for each dimension member (Block 327). This information is then inserted or organized into a count format that is associated with the count pattern and output to a display to be viewed by a user (Block 329). In the count pattern format example, the output could be "Three stock rose for every two that fell on the New York Stock Exchange." The result data can also be stored or otherwise output for the user.

Figure 3D:
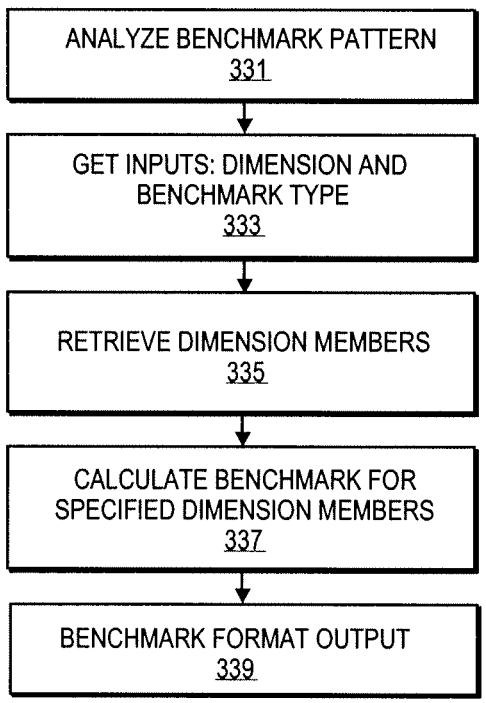
FIG. 3D is a flowchart of one embodiment of a pattern for benchmark analysis.

FIG. 3D is a flowchart of one embodiment of a pattern for benchmark analysis. In the example pattern, a benchmark pattern is initiated by the selection of the specific benchmark pattern by a user (Block 331). A benchmark pattern can be selected by a user based on the user's intent identifier. For example, a benchmark pattern may be selected to determine the historical context of the status of major market indices for a given time period. The process then receives the inputs specified by the user, in this case, dimension data and benchmark type data for a specific multi-dimensional storage structure (Block 333). In the major indices benchmark example, the dimension would be selected from the available parameters as 'major market indices' and the benchmark type data selected as 'first down stock performance.' In some embodiments, the identified input data is retrieved as an object, block or set of data. The specific data required for the pattern is then retrieved from this data (Block 335). In the benchmark pattern, the dimension members are identified. The dimension members are then used to determine the benchmarks for each dimension member (Block 337). This information is then inserted or organized into a benchmark format that is associated with the benchmark pattern and output to a display to be viewed by a user (Block 339). In the bench pattern format example, the output could be "All major indices closed the week down for the first time since the week of May 11." The result data can also be stored or otherwise output for the user.

Figure 3E:
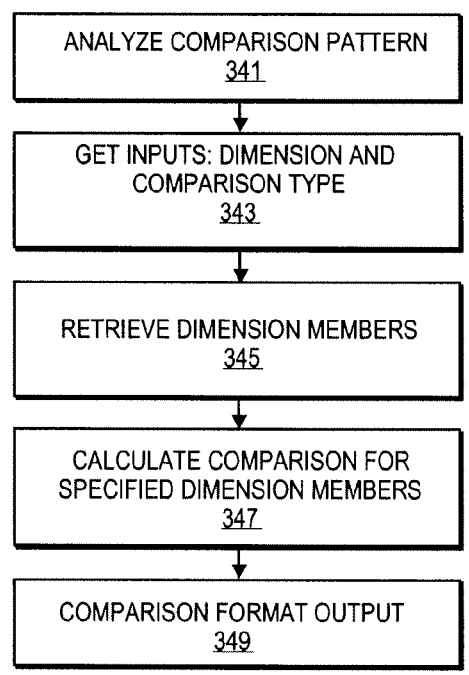
FIG. 3E is a flowchart of one embodiment of a pattern for comparison analysis.

FIG. 3E is a flowchart of one embodiment of a pattern for comparison analysis. In the example pattern, a comparison pattern is initiated by the selection of the specific comparison pattern by a user (Block 341). A comparison pattern can be selected by a user based on the user's intent identifier. For example, a comparison pattern may be selected to compare the performance of two stocks for a given time period. The process then receives the inputs specified by the user, in this case, dimension data and comparison type data for a specific multi-dimensional storage structure (Block 343). In the stock performance comparison example, the dimension would be selected from the available parameters as 'tech companies' and the comparison type data selected as 'stock performance.' In some embodiments, the identified input data is retrieved as an object, block or set of data. The specific data required for the pattern is then retrieved from this data (Block 345). In the comparison pattern, the dimension members are identified. The dimension members are then used to determine the comparison of each dimension member (Block 347). This information is then inserted or organized into a comparison format that is associated with the comparison pattern and output to a display to be viewed by a user (Block 349). In the comparison pattern format example, the output could be "Apple shares added $3.60, or 2.7 percent to $139.48 while rival smart phone maker Palm, Inc. jumped more than 6 percent, rising 87 cents to $13.93." The result data can also be stored or otherwise output for the user.

Figure 4A:
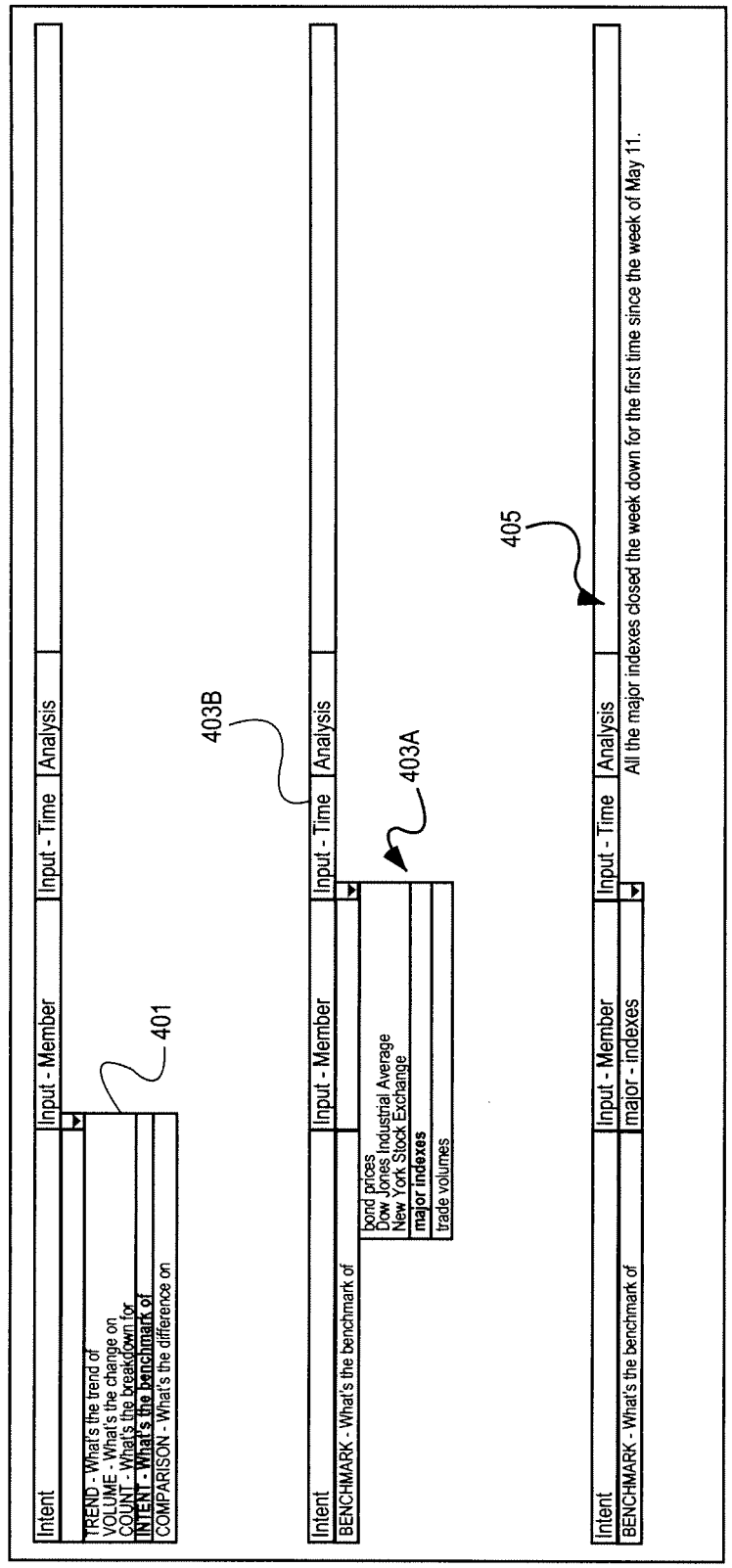
FIG. 4A is a diagram of one embodiment of a menu-based user interface for pattern analysis.

FIG. 4A is a diagram of one embodiment of a menu driven user interface for the pattern analysis system. In the example user interface, an initial set of menus 401 is provided. In the example, drop down menus are present. In other embodiments, other types of menus and similar user interface mechanism are utilized. The first menu 401 is tied to the pattern selection. It is displayed to the user as a set of possible patterns. The description of the patterns is in the form of a question or similar representation of user intent. For example, a trend pattern can be presented as "Trend—What's the trend of."

After a pattern has been selected that most closely matches the user intent, then a second menu 403A is made active. The second menu 403A displays a list of possible parameters for the selected pattern. Any number of input selection menus 403A, 403B or similar user interface mechanisms can be utilized to allow a user to be selected from the available parameters. The number of inputs and the range of parameters are defined in the selected pattern.

Once the pattern and parameters have been selected the user interface is automatically updated to display the formatted result. The pattern engine executes the pattern based on the currently selected set of parameters. A user can dynamically change the patterns and parameters to automatically obtain results based on these changes.

Figure 4B:
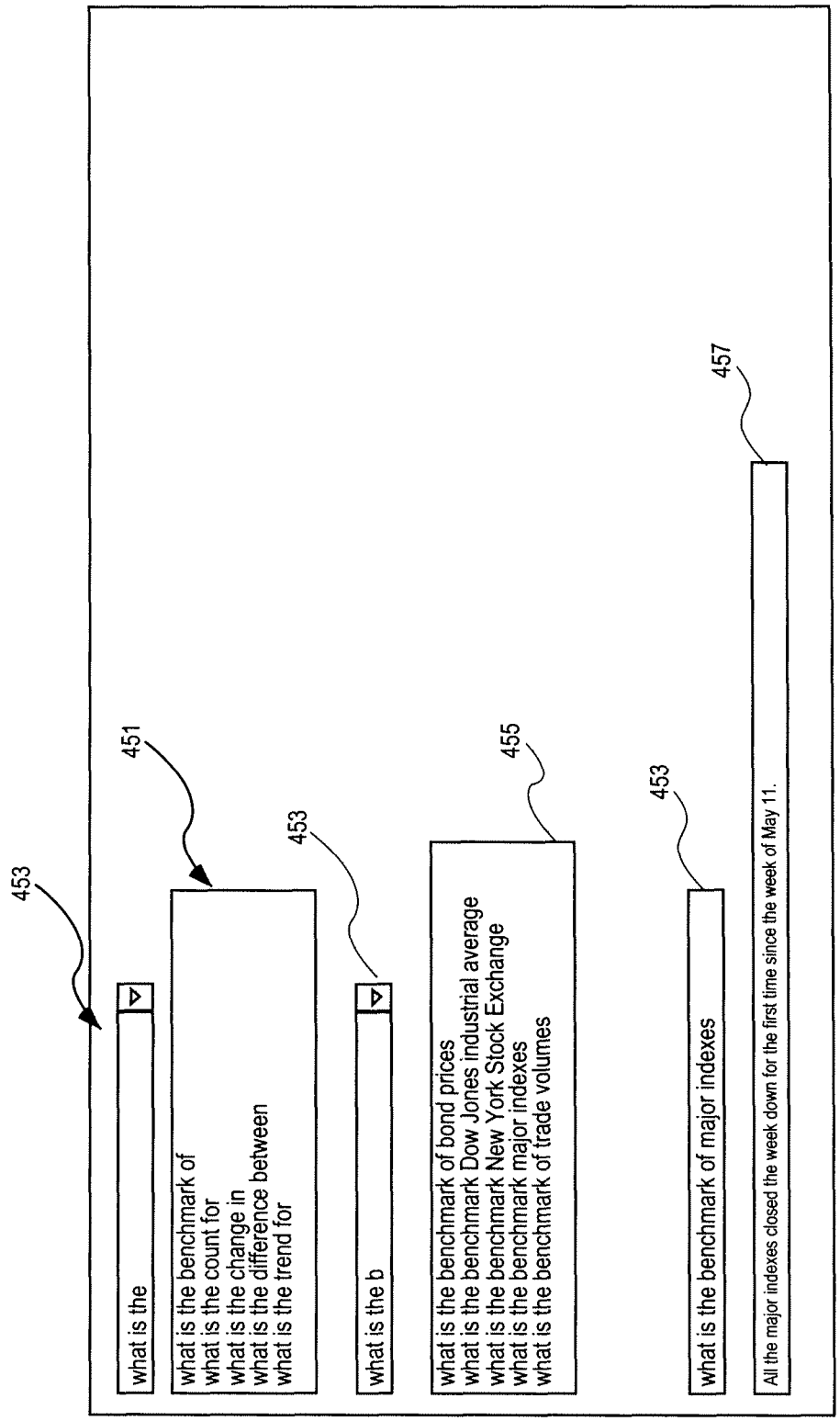
FIG. 4B is a diagram of one embodiment of a text-based interface for pattern analysis.

FIG. 4B is a diagram of one embodiment of a text-based interface for pattern analysis. In this embodiment, the user is allowed to input their intended question or query as text through a text input field 453. The user interface is automatically updated to provide a pattern matching window 451 with all defined user intention identifiers that match or partially match the input text. At any point, the user can select an option from the pattern matching window 451. The user can continue to type and define their interest to further narrow the options that are provided in the pattern matching window 451.

Once a pattern has been selected from the pattern matching window 451 or by typing in the text field 453 the pattern matching window displays parameter matching options 455. A user can select a parameter matching option at any time or can continue to type and narrow the range of the options until a set of parameters is selected through the window or a single option remains in the window.

Once the pattern and input parameters have been selected a result is automatically generated and displayed 457 by the pattern engine. The generated results can be dynamically updated in response to a user altering the input parameter selection or pattern selection through the alteration of the text field 453. Thus, the user is able to obtained desired result information without any specific knowledge of the syntax or semantics of a query language and/or without any knowledge of the multi-dimensional storage structure in which available data is stored.

Figure 5:
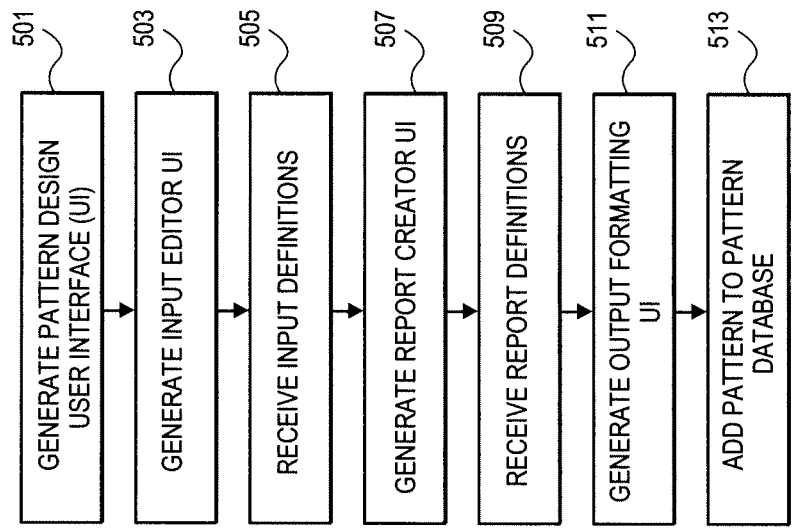
FIG. 5 is a flowchart of one embodiment of a process for pattern design.

FIG. 5 is a flowchart of one embodiment of a process for pattern design. In one embodiment, the pattern design process can be initiated by a user by selection of the pattern designer or through the patter services module. The pattern designer and/or patter services module in combination with the user interface layer generate a user interface for designing patterns (Block 501). The user interface can utilize menus, text fields, button, frames and similar user interface elements to provide the user with a set of tools for defining new patterns to be added to the system.

In one embodiment, the pattern designer provides a guided interface for generating a new patter. The pattern designer first prompts and provides an interface for defining a set of parameters for a new pattern through the input editor (Block 503). The input editor can have an integrated user interface with the overall pattern designer or can have a separate screen or window to enable a user to define the set of parameters to associate with a pattern. The input editor can restrict the set of parameters present to those available in accessible multi-dimensional storage structures or those that have a relationship in these structures to those parameters that have already been defined.

The input information received through the input editor includes a name of an associated pattern, a user intent identifier, a set of parameters and an associated report identifier (block 505). The received data can be stored as a part of the pattern and managed by the model administration or can be similarly stored. After the input data has been received or defined, then the pattern designer can advance to the report creation stage.

The report creator in combination with the pattern designer, user interface layer and/or pattern services module generates a user interface to enable the user to define a report to be associated with a new pattern (Block 507). In another embodiment, the report creator can also present existing reports that can be modified or associated as-is with the new pattern. The report creator can have an interface that is integrated with the pattern designer or a separate screen or window. The report creator receives a report name, report sequence, result definition, and output format indicator (Block 509). The report sequence specifies a set of functions, calculations or similar actions that are to be performed on the specified parameters and related data. After the report data has been received or defined the output formatting must be specified.

The output formatter in combination with the pattern designer, user interface layer and/or pattern services module generates a user interface to enable the user to define a report format to be associated with a new pattern (Block 511). In another embodiment, the output formatter can also present existing templates that can be modified or associated as-is with the new pattern. The output formatter can have an interface that is integrated with the pattern designer or a separate screen or window. The output formatter receives a output name, result value identifier and output template indicator. After the output format data has been received or defined the pattern is saved and added to the model repository of available patterns (Block 513). The set of available patterns can be managed by the model administration layer or similar component of the system.

In one embodiment, the pattern analysis system can be implemented as a set of hardware devices. In another embodiment, the system components are implemented in software (for example microcode, assembly language or higher level languages). These software implementations can be stored on a computer-readable medium. A "computer-readable" medium can include any medium that can store information. Examples of the computer-readable medium include a read only memory (ROM), a floppy diskette, a CD Rom, a DVD, a flash memory, a hard drive, an optical disc or similar medium.

In the foregoing specification, the invention has been described with references to specific embodiments. It will, however, be evident that various modifications and changes can be made thereto without departing from the broader spirit and scope that is set forth in the appended claims. The specification and drawings are accordingly to be regarded in illustrative rather than a restrictive sense.

What is claimed is:

1. A method comprising:
receiving a pattern selection from a user through a guided user interface that restricts the pattern selection to one of a set of available patterns in a multi-dimensional data source without requiring specific user knowledge of the set of available patterns;
receiving a parameter selection from the user through the guided user interface that restricts the parameter selection to a set of available parameters in the multi-dimensional data source associated with the pattern selection; and
executing by a computer system the pattern selection and the parameter selection on the multi-dimensional data source to obtain a report with deterministic values.

2. The method of claim 1, wherein the set of available patterns include a trend analysis pattern, a volume analysis pattern, a count analysis pattern, a benchmark analysis pattern, and a comparison analysis pattern.

3. The method of claim 1, further comprising:
receiving user input defining a pattern through a pattern design component.

4. The method claim 3, wherein defining the pattern further comprises:
receiving user input defining allowable parameters, a user intent identifier and an analysis report for the pattern through an input editor.

5. The method of claim 4, wherein defining the analysis report further comprises:
receiving user input defining a report sequence, analysis result and output format through a report creator.

6. The method of claim 5, wherein defining the output format further comprises:
receiving user input defining an output template.

7. The method of claim 1, wherein the guided user interface is menu driven or text-based.

8. The method of claim 1 wherein the at least one parameter specifies or limits data for the pattern.

9. The method of claim 1 wherein executing by a computer system the pattern and the at least one parameter on a multi-dimensional data source to obtain a report with deterministic values comprises:
accessing, at the multi-dimensional data source, measure data and any one of numeric data or dimensional data identified by the at least one parameter;
defining a formula of the pattern to apply to the accessed data; and
applying the formula to the accessed data.

10. An apparatus comprising:
a processor;
a pattern services module executed by the processor to receive a user input and provide, through a display of the computer system, a guided user interface that restricts the user input to one of a plurality of defined patterns that are available at a multi-dimensional data source; and
a pattern engine module coupled to the pattern services module, the pattern engine module to execute a pattern available at the multi-dimensional data source selected by the user on the multi-dimensional data source to generate a report with deterministic values.

11. The apparatus of claim 10, wherein the pattern services module restricts parameters input to at least one of a plurality of parameters specific to the pattern.

12. The apparatus of claim 10, further comprising:
a pattern design module to provide an interface for defining a pattern.

13. The apparatus of claim 12, wherein the pattern design module comprises:
an input editor module to provide a user interface to define allowable parameters, a user intent identifier and an analysis report for the pattern.

14. The apparatus of claim 12, wherein the pattern design module comprises:
a report creator module to define a report sequence, analysis result and output format.

15. The apparatus of claim 12, wherein the pattern design module comprises:
an output formatting module to define an output template.

16. A non-transitory computer-readable medium having instructions stored therein, which when executed, cause a computer to perform a set of operations comprising:
generating a guided user interface to restrict user requests to a plurality of defined patterns available at a multi-dimensional data source;
executing by a computer system a user selected pattern available at the multi-dimensional data source to generate a report using the multi-dimensional data source to be output to a user, the output being deterministic.

17. The non-transitory computer-readable medium of claim 16, wherein the guided user interface is one of a menu-based or text-based interface.

18. The non-transitory computer-readable medium of claim 16, having further instructions stored therein, which when executed cause the computer to perform a further set of operations comprising:
generating a pattern design interface to enable a user to define a pattern.

19. The non-transitory computer-readable medium of claim 16, having further instructions stored therein, which when executed cause the computer to perform a further set of operations comprising:
restricting parameter selection for a pattern through the guided user interface based on a plurality of defined parameters for the pattern.

20. The non-transitory computer-readable medium of claim 16, having further instructions stored therein, which when executed cause the computer to perform a further set of operations comprising:
receiving user input defining allowable parameters, a user intent identifier and an analysis report for a pattern through an input editor.

21. The non-transitory computer-readable medium of claim 16, having further instructions stored therein, which when executed cause the computer to perform a further set of operations comprising:
receiving user input defining a report sequence, analysis result and output format through a report creator.

* * * * *